(12) United States Patent
Hater et al.

(10) Patent No.: US 6,283,676 B1
(45) Date of Patent: Sep. 4, 2001

(54) SEQUENTIAL AEROBIC/ANAEROBIC SOLID WASTE LANDFILL OPERATION

(75) Inventors: Gary R. Hater; Roger Green, both of Hamilton County, OH (US); Gerard Hamblin, Ozaukee County, WI (US)

(73) Assignee: Waste Management, Inc., Houston, TX (US)

( * ) Notice: Subject to any disclaimer, the term of this patent is extended or adjusted under 35 U.S.C. 154(b) by 0 days.

(21) Appl. No.: 09/468,159

(22) Filed: Dec. 21, 1999

(51) Int. Cl.[7] .................................................. B09B 1/00
(52) U.S. Cl. .......................... 405/129.57; 405/129.85; 405/129.7; 405/129.6; 210/747
(58) Field of Search .................................. 405/128, 129, 405/129.1, 129.2, 129.35, 129.45, 129.57, 129.6, 129.7, 129.95; 210/747, 170

(56) References Cited

U.S. PATENT DOCUMENTS

| | | | |
|---|---|---|---|
| 4,323,367 | * | 4/1982 | Ghosh ................................. 405/129 |
| 4,401,569 | * | 8/1983 | Jhaveri et al. ...................... 405/128 |
| 4,849,360 | * | 7/1989 | Norris et al. ........................ 405/129 |
| 4,850,745 | * | 7/1989 | Hater et al. ........................ 405/128 |
| 5,259,697 | * | 11/1993 | Allen et al. ......................... 405/129 |
| 5,564,862 | * | 10/1996 | Markels, Jr. ........................ 405/129 |
| 5,618,427 | | 4/1997 | Seech et al. . |
| 5,753,494 | * | 5/1998 | Hater et al. ......................... 405/128 |
| 5,857,807 | * | 1/1999 | Longo, Sr. .......................... 405/129 |
| 6,024,513 | * | 2/2000 | Hudgins et al. .................... 405/129 |

OTHER PUBLICATIONS

Augenstein, et al., "Yolo County Controlled Landfill Demonstration Project", *Proceedings of the 20th Annual Solid Waste Association of North America Landfill Gas Symposium*, Monterey, CA, Mar. (1997).
Barber, et al., "Ch. 3.13 Full–Scale Experience", *Leachate Recirculation*, 381–401, Academic Press, London, UK (1989).
Diamadopoulos, "Characterization and Treatment of Recirculation–Stabilized Leachate", *Wat. Res.*, 3 (12):2439–2445 (1994).
EPA, "Landfill Bioreactor Design and Operation", Seminar Publication, Wilmington, DE, Mar. 23–24 (1995).
Gould et al., "Factors Influencing Mobility of Toxic Metals in Landfills Operated with Leachate Recycle", *American Chemical Society*, 16:267–291 (1990).
Ham, et al., "Decomposition of Solid Waste in Test Lysimeters", *J. Env. Eng.* 108:1147–1170 (1982).

(List continued on next page.)

*Primary Examiner*—David Bagnell
*Assistant Examiner*—Frederick L. Lagman
(74) *Attorney, Agent, or Firm*—McDonnell Boehnen Hulbert & Berghoff

(57) ABSTRACT

Landfills including multiple lifts having horizontal piping layers and methods for their use to accelerate anaerobic and/or aerobic degradation of municipal solid waste to increase landfill capacity.

20 Claims, 7 Drawing Sheets

OTHER PUBLICATIONS

Heerenklage and Stegmann, "Overview on Mechanical–Biological Pretreatment of Residual MSW", *Proc. Sardinia 95, Fifth International Landfill Symposium*, 913–925, Oct. 2–6 (1995).

Komilis et al., "The Effect of Landfill Design and Operation Practices or Waste Degradation Behavior: a Review", *Waste Manage. Res.*, 17:22–26 (1998).

Komilis et al., "The Effect of Municipal Solid Waste Pretreatment on Landfill Behavior: a Literature Review", *Waste Manage. Res.*, 17:10–19 (1998).

Lagerkvist et. al., "Control of Two Step Anaerobic Degradation of Municipal Solid (MSW) by Enzyme Addition", *Wat. Sci. Tech.*, 27(2):47–56 (1993).

Leikam et al., "In–Situ Stabilisation of Completed Landfills and Old Sites." (undated).

Maris et al., "Treatment of Landfill Leachate; Management Options", *Water Poll. Res. J. Canada*, 20(3):25–42 (1985).

Moore et al., "Hydraulic Characteristics of Municipal Solid Wastes: Findings of the Yolo County Bioreactor Landfill Projects", *The Thirteenth International Conference on Solid Waste Technology and Management*, Philadelphia, PA, Nov. 16–19 (1997).

Onay et al., "In Situ Nitrification in Controlled Landfills", *J. Env. Eng.*, 652–658.

Owens et al., "Biochemical Methane Potential of Municipal Solid Waste (MSW) Components", *Wat. Sci. Tech.*, 27(2):1–14 (1993).

Pohland et al., "Leachate Generation and Control at Landfill Disposal Sites", *Wat. Poll. Res. J. Canada*, 20(3):10–24 (1985).

Rivard, "Anaerobic Bioconversion of Municipal Solid Wastes Using a Novel High–Solids Reactor Design", *Applied Biochemistry and Biotechnology*, 39/40:71–81 (1983).

Sesay et al., "Aerated Static Pile Composting of Municipal Solid Waste (MSW): a Comparison of Positive Pressure Aeration with Hybrid Positive and Negative Aeration", *Waste Manage. Res.*, 16(3):264–272 (1998).

Stegmann and Spendlin, Ch. 2.3 German Experiences, Enhancement of Degradation, (1989).

VanderGheynst et al., "High–Solids Aerobic Decomposition: Pilot–Scale Reactor Development and Experimentation", *Process Biochemistry*, 32(5):361–375 (1997).

Walsh, "Environmental Transformation Products of Nitroaromatics and Nitramines", USACE Special Report 90–2, Feb. (1990).

Warith et al., "Effect of Leachate Recirculation on Municipal Solid Waste Biodegradation", *Water Qual. Res. J. Canada*, 34(2):267–280 (1999).

Weston, Inc., "Windrow Composting Demonstration for Explosives–Contaminated Soils at Umatilla Depot Activity", USAEC Report, Hermiston, OR, Aug. (1993).

Yolo County Department of Public Works, "Methane Enhancement by Accelerated Anaerobic Composting at the Yolo County Central Landfill", California Energy Commission Final Report, Jun. (1997).

Merz, R.C. and R. Stone, "Landfill Settlement Rates", *Public Works*, vol. 93, No. 9 (1962).

Leckie, J.O. and J.G. Pacey, "Landfill Management with Moisture Content", *Journal of the Environmental Engineering Division*, Proceedings of the American Society of Civil Engineers, vol. 105, No. EE2, pp. 337–355 (1979).

Iaacson, R., J. Pfeffer, P. Mooij and J. Geselbracht, "Ref-Com–Technical Status, Economics and Market," In: Proceedings of the Fall Technical Conference NSWMA, Boston, MA. (1986).

Malta–Alvarez, J. and A. Martineze–Viturtia, "Laboratory Simulation of Municipal Solid Waste Fermentation with Leachate Recycle", *J. Chem. Tech. Bioteechnol.* vol. 36, pp. 547–556 (1986).

Matusato, T., Tanaka, N. & Koyoma, K. "Stabilization Mechanism of Leachate from Semi–aerobic Sanitary Landfills of Organic–rich Waste", In: Christensen, T.H., Cossu, R. & Stegmann, R. (eds). Proceedings Sardinia 91, Third International Landfill Symposium. Cagliari, Italy: CISA (1991).

Stegmann, R. and Spendlin, H.H., Enhancement of Biochemical Processes in Sanitary Landfills, "International Sanitary Landfill Symposium", 2, 1–16 (1987).

Natale, B.R. and W.C. Anderson, "Evaluation of Landfill Leachate Recirculation," Environmental Engineering, Proceedings of the 1986 Specialty Conference. ASCE, Environmental Engineering Division, Cincinnati, OH, pp. 134–139 (1986).

Barber, C. and P.J. Maris, "Leachate Recirculation: Full–Scale Experience", In: T.H. Christensen (ed.), *Landfilling of Waste: Leachate*, Elsevier, New York, pp. 381–401 (1992).

\* cited by examiner

SEQUENTIAL AEROBIC/ANAEROBIC SOLID WASTE LANDFILL OPERATION

BACKGROUND OF THE INVENTION

(1) Field of the Invention

This invention concerns landfill bioreactors and methods for their use to accelerate anaerobic and/or aerobic degradation of municipal solid waste in a manner that increases the landfill capacity.

(2) Description of the Art

The bioreactor landfill concept has been examined in lab and pilot scale projects since the 1960's (Merz). Merz found that placing refuse in thick lifts with continuous leachate spraying on the working face can provide increased landfill densities of 35%. He also discovered that a landfill constructed in an aerobic manner with leachate/water addition can increase settlement rates as much as three times that of an anaerobic landfill. In 1969 the U.S. Public Health Service (predecessor to USEPA), funded research to investigate processes that would result in maximum conversion of municipal solid waste (MSW) to gas (methane and CO2). Since energy was cheap at the time, a goal was to reduce the weight and volume (i.e., increase the density) of the solid waste remaining for disposal. However, the state of the first energy crisis started in 1973 led to projects focused on enhanced methane production. Large scale projects were conducted in the early to mid '70s by Leckie & Pacey (1979) and Ham (1982).

Profs. Robert Ham and Fred Pohland have been studying methods to enhance methane production and waste degradation for the last 30 years. Both have used measured increases in methane production and viewed methane as an energy source to be exploited as the primary goal of landfill stabilization. The DOE sponsored several projects in the late '70s during the "second energy crisis" to demonstrate that MSW could provide a renewable source of energy with bioreactor technology (Waste Tec 1986). A bench scale study conducted in Spain (MataAlvarez, 1986) showed that with optimum temperature range of 34–38° C., inoculation of digested pig manure, and moisture contents of 87% by leachate recirculation, more than 90% of biodegradable matter was degraded within 25–57 days. The model for a scaled up landfill showed a landfill life of 1.5–2 years with 95% of the biodegradable matter being reduced during the first year.

In 1988, USEPA in the preamble to the draft Subtitle D rules indicated that leachate recirculation (as allowed by the draft and final Subtitle D regulations) should provide the following benefits: 1. Increases the rate of waste stabilization; 2. Improve leachate quality; 3. Increase the quantity and quality of methane gas production; 4. Provide a viable on-site leachate management method; 5. Maximize rate and quantity of methane energy recovery; and 6. Shorten the duration of methane generation and reduces long term risks.

Matsuto (1991) studied the concept of constantly maintaining an aerobic layer at the bottom of a landfill. Based on bench scale work as well as modeling, with BOD removal from leachate was achieved in the bottom aerobic layer. This confirmed the work of Stegman (1987) who also observed that the methanogenic stage occurred much faster.

Stessel (1992) conducted unique lab studies using aerobic treatment of all MSW with leachate recycle. This work showed MSW could take up to 70% moisture (wet weight) and achieve 50% settlement. Rapid degradation of waste and leachate could occur within months. He later wrote about and provided conceptual designs of the re-usable landfill and piloted work on landfill mining techniques. No methane is generated in this process therefore no gas collection systems are required. The primary goal of the Stessel study was rapid stabilization and re-use of landfill space.

In 1995 the USEPA Office of Research and Development sponsored the first of two workshops on Landfill Bioreactor Design and Operation. The projects presented in 1995 and 1996 workshops reviewed the "application of leachate recirculating municipal solid waste landfills aimed at reducing environmental risk and optimizing environmental risk and optimizing landfill volume by encouraging active biological decomposition within the contained waste system." (USEPA, 1995). The ORD also acknowledged that EPA sponsored studies in the early '80s demonstrated that water, leachate recirculation, and sludge addition all enhanced methane production for energy recovery.

A good review of literature on bioreactors is found in two papers by Komilis, Ham, and Stegmann (1999) and in a book by Reinhart and Townsend "Landfill Bioreactor Design &Operation" 1997. An observation made in both references is that maintaining high levels of moisture evenly within the landfill with leachate recirculation is the key to rapid stabilization of leachate and waste. The authors determined that the prior lab scale work focused on leachate recirculation as the primary method of affecting leachate quality, waste stabilization, waste settlement, gas production, attenuation of heavy metals and priority pollutants, and other factors. The parameters that were evaluated were moisture content, pH, temperature, availability of macro- and micro-nutrients and the presence of suitable microorganisms as the main parameters controlling landfill stabilization. Pre-treatment techniques such as thermal, mechanical (i.e., particle size) and biological were also examined. Additives other than leachate were studied. The additives included water, anaerobically digested sludge that ensured suitable anaerobic and facultative microorganisms are present, and other liquids. Some of these studies had contradicted other studies, especially on the importance of adding buffer, nutrients, and sludge in enhancing degradation. Most studies concluded that increasing moisture distribution and content up to 70% on a wet-weight basis optimized the speed of biodegradation.

The most prominent and frequently cited case histories in the literature are: Leckie and Pacey, (1979), Lycoming County, Penn. (1978–'85), Seamer Car Landfill, UK (1979–1984), Delaware Solid Waste Authority (DSWA), numerous sites in Germany started in 1981, but most notably Bornhausen Landfill and reviewed by Stegman and Spendling (1989), Binghamton, N.Y., and SORAB, Sweden.

Leckie and Pacey conducted a demonstration on 6 large test cells at Mountain View, Calif. They found that leachate recirculation resulted in rapid stabilization of the waste as indicated by direct measurements of VS, cellulose content, carbon/nitrogen, and carbon/phosphorus ratios. They also concluded that high moisture content and sludge addition increased methane production. Settlement was also measured at 20–25 percent. Some problems were noted with gas leaks and water infiltration.

Lycoming County Landfill was one of the first operating landfills to practice leachate recirculation at full scale. A variety of recirculation methods were tried including spray irrigation, vertical wells, open trenches, and trenches filled with auto fluff or baled fiberglass. The last two methods were most effective in wicking the leachate to larger areas of the refuse. Results were improved waste degradation and methane generation, rapid stabilization of leachate quality (close to pilot-scale studies), and empirical evidence of increased settlement compared to dry areas of the landfill. Also, the importance of eliminating clayey daily cover or pushing back daily cover to allow leachate to drain was discovered.

The Seamer Car Landfill in Britain conducted a full scale demonstration of leachate recirculation by spraying leachate on top of the landfill and enhanced the method with surface furrowing. A low permeability intermediate cover, however, created a perched water table. This created a saturated condition above the base liner of the landfill, but showed that with increased moisture content, there was a more rapid reduction in leachate organic strength. Significant reductions in organics were noted within 2–3 years of operation. They also raised a concern for the residual COD, ammonia and chloride concentrations remaining in the leachate, although the metals and organics were treated.

The Delaware Solid Waste Authority (DSWA) has recirculated leachate in its three landfills since 1981. A variety of methods have been used including spray irrigation, recharge wells, and surface application. The main advantage of leachate recirculation was the avoided costs of building a leachate treatment plant estimate to cost up to $6 million. Other benefits included accelerated biodegradation of organics in the waste, reduced risks to the environment, and increased production of landfill gas.

Germany had over 13 landfills practicing leachate recirculation in 1981 using spray irrigation, spray tankers, and horizontal distribution pipes. Fast reduction in BOD and COD was reported after four years and no increase in salts or heavy metals was noted. Also, at sites that had waste placed in thin-layers (i.e., 6 ft.) leachate was observed to have very low strength. The Bornhausen Landfill incorporated both thin layer operations and leachate recirculation. This site was studied by Stegman (the Ham/Pohland equivalent of Germany). The thin layers were loosely compacted as opposed to rapid vertical filling. This promoted natural ventilation and some aerobic decomposition. Oxygen penetrated up to 3 feet within the waste mass. Three test sites were set up at the site. Leachate recirculation resulted in a 50 percent decrease in time required for stabilization in the site without leachate recirculation (230 days vs. 460 days). Another significant application involved the introduction of highly concentrated leachate from new landfill cells over older cells in which stabilized leachate was already being produced. This showed a large increase in treatment with a 90 and 99 percent reduction in COD and BOD respectively. This showed that stabilized waste is very effective in providing additional treatment.

Nanticoke Landfill in Binghamton, N.Y. was one of the first sites to investigate the affects of leachate recirculation on enhancement of landfill gas. The leachate recirculation parameters studied were moisture content, pH, temperature, and nutrients. Nutrients were controlled by varying the quantity of wastewater treatment plant sludge added to the waste. The highest gas production was in cells with sludge (over an order of magnitude higher than cells with no sludge). Also, the best leachate quality was in cells with high gas yielding cells. The conclusion was that sludge added at a rage of 0.45 kg per 115 to 160 kg of MSW would produce optimum results for gas production, gas quality, and leachate quality.

The SORAB, Sweeden test cells used recirculated leachate that was heated to maintain a temperature of 35 to 40° C. The gas production was reported to be an order of magnitude higher than typical.

Several bioremediation sites have been developed by WMI. The Spruce Ridge Resource Management Facility started recirculating leachate in July, 1997 using lateral drains over about 40 feet of waste and again on the final grade of about 90 feet of waste. Gravel backfill is used with perforated HDPE pipe. The unique features of this site demonstration were the installation of settlement plates at both an adjacent cell operated the normal "dry"method and the leachate recirculation cell. Settlement has been measured from 18 to 20 percent and recent density measurements are about 1900 lbs/yd3. Waste is originally placed at a density of 1200 to 1300 lb/yd3. Gas wells were just installed last spring and around the area of lateral drains. The waste appeared to be between dry to moist. Gas production is high quality with about 55 to 60% methane. It is estimated that gas production is 3.5 times the other areas of the landfill that were conventionally operated (i.e., dry methods). Recent leachate data from cell 2 shows substantial enhancement in degradation compared to the control.

In 1998, the Earthmovers Landfill, in Elkhart, Ind. began recirculation of almost 4 million gallons of leachate into 2 cells. Both cells have dedicated 4-inch slotted HDPE drain pipe with 1–6" tire chip filled trenches that vary from 150 to 300 feet in length. The system was designed using a modified groundwater model for spacing, flow, and distance from side slopes. Leachate is injected at a rate of 100 gpm with 6–30 minute rest periods during the day. This equals a rate of 100 gallons per foot of trench per day. The site takes about 80% industrial and special waste and 20% residential. The leachate generation rate is 56 gallons per acre per day.

The Atlantic Landfill in Waverly, Va. includes a cell having 2 levels of HDPE pipe with perforations every 10 feet to ensure lateral distribution to the end of the pipe. Tire chips were used as backfill and pipe was laid in trenches that are 50 feet apart. In the fall of '98, due to new cell 3 construction and storms, over 3.5 million gallons was injected in Cell 2. During the first 3.5 months of 1999, new surveys showed that cell 2 reclaimed over 48,000 yds with settlement of 3 to 4 feet. A force main system is used to pump in leachate with an average flow of 80 gpm for 2 weeks straight. The gas flow is estimated to be 10 times normal gas production.

The Middle Pennusisula Landfill in VA includes one cell including a 450 foot long perforated HDPE pipe with tire chip backfill in the first 40 feet of gabarge over lain by another 40 to 60 feet of garbage. This pipe handled up to 500 gpm before running out of leachate. The overburden of garbage seems to have restricted flow and it was assumed that the lower lift was saturated. Gas wells, however, recently were installed on top of the cell and drilled within feet of the injection line. (Gas also is collected from the leachate injection line on periods of rest with a valve that directs gas to the active collection system.) The garbage from the gas wells appeared dry to moist, but not saturated.

Leachate recirculation has been practiced in the Blackoak Landfill in Missouri with lateral injection lines of perforated HDPE pipe with a force main feed to a header line to horizontal trenches in one cell. This has enabled the site to avoid any off-site leachate hauling for the year of operation of the system. The system was installed as soon as the cell was 30 feet tall. An additional 20 feet of waste was placed on top of the recirculation galleries. There was a 10 foot drop in grade over the total 50 feet of height of the cell. Leachate data from the recirculation cell was compared to the old cells that were operated normally (dry). Leachate from the recirculation cell was enriched in organics and ammonia nitrogen showing substantial increased degradation of the waste.

Phase I of a demonstration of an aerobic method of accelerating degradation of MSW was conducted at Live Oak Landfill, Atlanta, Ga. A 2.5 acre test cell with 70,000 cubic yards of waste that was three years old and fully anaerobic was used. Vertical injection wells for leachate and air were installed in the test cell. Leachate recirculation began for a month before air was injected. Air injection caused an immediate reduction of methane from 55 percent to less than 10 percent within 24 hours. Within 14 weeks of air injection, the landfill settled one foot out of 30 feet. Also, the waste from drilling tests showed a compost-like material that was stable according to respirometry tests. Additional testing showed the screened waste materials would pass compost standards of the State.

The cell continued to operate aerobically for 9.5 months and 1.8 million gallons of water and leachate were added at an average of 6,819 gallons per day. Settlement measurements over 6 months indicated about 15 percent settlement. Leachate quality peaked in organics by the fourth month of operation and started to decline when monitoring activities ceased. This type of leachate recirculation demands about 7–10 times moisture available through leachate on site.

The Springhill Landfill in Florida sprays leachate on the working face at a rate of about 10 gallons/cu yd. Densities have increased from about 1250–1300 lbs/cu yd to 1800 lbs/cu yd over the last three years.

At a site is owned by Yolo County in Woodale, Calif., a pilot landfill bioreactor and a control cell was constructed in 1996. Two lined cells were constructed and filled with 8,568 tons of solid waste and 1,336 tons of green waste as alternative daily cover while the control cell had 8,737 tons of solid waste and 1,454 tons of alternative daily cover of green waste. Both sites were built in a pyramid shape above grade and about 10 to 15 feet below grade. A geomembrane liner was used to cover both sites before liquid was added to the enhanced cell.

Liquid (groundwater and leachate) was added to the site starting on Oct. 23, 1996 up to Oct. 15, 1998 after which leachate continued to be recirculated at a rate of several hundred gallons per day. A total of 1,159,616 gallons of liquid was added to the apparent field capacity of 46% dry waste weight assuming a 20% moisture of in place waste. The waste adsorbed up to 45 gallons per ton of "as-placed" waste. As of May, 1999, the enhanced cell settled 67 inches (about 15 to 18%) compared to the control cell settlement of 10 inches (about 2%). Landfill gas volume was over twice the annual volume from the beginning of liquid addition to May, 1999 with the average flowrate of over 4 and 7 times the control cell during 1998 and up to May, 1999 with the control cell declining at a faster rate and lower yield. The bottom of the site had transducers and piezometers that have shown. Leachate data in the enhanced cell showed enrichment during the first year in organics and TDS and a decline in subsequent years. VOCs and metals followed a similar trend. The control cell yielded a very dilute leachate showing very little organic decomposition.

The county owned landfill in Worcester Co. Maryland, started leachate recirculation in 1991 in order to control leachate disposal costs. Off-site hauling of leachate was costing the county over $100,000 per year. leachate recirculation was accomplished from the start of operations using concrete manholes that were build from the first operations layer upward to final grades. The bottom ten feet was solid pipe with the upper portions perforated. Leachate was recirculated using a water truck and manholes were installed at one per acre. The site recirculated two thirds of the leachate produced and trucked the other third off-site. This continued until 1998 and leachate quality was monitored quarterly for VOCs, metals, and indicators. This is the only long term full scale site that demonstrated that leachate quality follows lab findings and theory and increase in contaminant concentration at first and then improve in quality with time. Borings and test pits showed the amount of degradation was correlated with depth, with more moisture content increasing with depth. The upper quarter section of the landfill was the least degraded, showing that vertical injection most likely is not as efficient as horizontal pipe/trench applications. The degraded waste material was trommeled and screened with the fines passing the Maryland tests for compost. The State verbally approved the use of the fines for daily cover for the new cells. It is estimated that with construction and use of compost in three additional cells, that the original cell will be 50% depleted in its original volume. The waste filling then will return to cell one and continue leachate recirculation using the composted material from cell 2 for daily cover or eventually off-site applications.

A project was conducted in the field by the University of North Dakota, at Grand Forks for 6 years. One small cell of MSW was injected with landfill leachate and recirculated. The other cell had only water injected with the subsequent leachate removed and discarded and replaced by an equal amount of clean water. The results showed that within the first year, the leachate recirculation cell had higher concentrations of the tested constituents than the water addition cell. After the first year, the levels of contaminants were equal and the relative same level of treatment was achieved in both cells for the tested analytes of COD, metals, and pH.

SUMMARY OF THE INVENTION

It is an object of this invention to provide a method for degrading solid waste that increases landfill density and capacity.

It is another object of this invention to provide a method for degrading solid waste that accelerates landfill aerobic and/or anaerobic degradation.

It is still another object of this invention to provide a method for degrading solid waste that improves degradation by-product quality.

In yet another embodiment, this invention is a method for reducing noxious landfill gas emissions.

In one embodiment, this invention is a method for biodegrading municipal solid waste by sequential aerobic and anaerobic bioremediatoin. The method includes the steps of creating a landfill bioreactor having a bottom surface; locating leachate withdrawal piping on the landfill bottom surface; placing a first lift of waste material on top of the leachate withdrawal piping to form a first lift having a first lift top surface; placing a first piping layer on the top surface of the first lift; placing a second lift of waste on top of the first piping layer form a second lift having a second lift top surface; placing a second piping layer on the top surface of the second lift; and introducing air into the second lift using the first piping layer.

DESCRIPTION OF THE CURRENT EMBODIMENT

The present invention relates to a landfill bioreactor and to a method for constructing the bioreactor that allows for the sequential aerobic and/or anaerobic bioremediation of biodegradable waste lifts.

Figure 1:
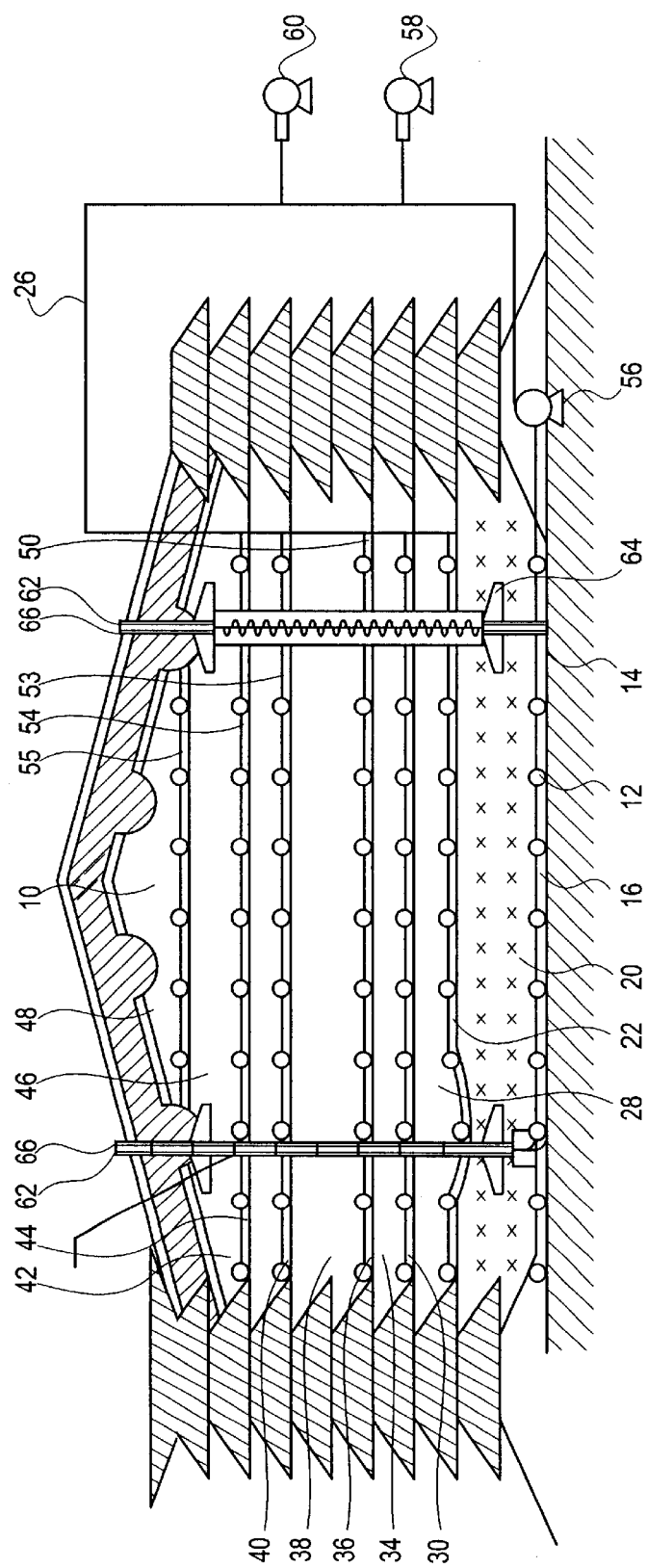
FIG. 1 is a side cross-section view of a landfill bioreactor cell of this invention.

FIG. 1 is a side cross-section view of a completed landfill bioreactor 10 of this invention. Landfill bioreactor 10 includes a leachate withdraw system 12 located at bottom 14 of landfill bioreactor 10. Landfill bioreactor 10 may include a bottom liner 16. If used, bottom liner 16 should be essentially impervious to liquids. Alternatively or in addition to having a bottom liner 16, the bottom of the landfill may include a layer of clay, cement or some other seal material. Generally, leachate withdraw system 12 will be located in a layer of gravel or some other pervious material. Locating the leachate withdrawal system 12 in gravel or some other porous material allows for the collection of leachate around the withdraw system 12. In addition, leachate withdraw system 12 will typically comprise one or more pipes having open ends or perforations to allow leachate to collect inside the withdrawal piping and be withdrawn from the landfill bioreactor bottom 14.

Located immediately above the leachate withdraw system 12 is a first lift 20 of waste material. First lift 20 has a top surface 22 on which is located a first piping layer 24. First piping layer 24 is an essentially horizontal layer of piping that is connected to piping manifold 26. First piping layer 24 can take on any pattern necessary to deliver or withdraw liquids such as leachate and gases such as air to or from first lift 20.

A second lift 28 of waste material is placed on first piping layer 24. Second lift 28 has a top 30 on which it is located second piping layer 32. Landfill bioreactor 10, depicted in FIG. 1, includes third lift 34 having a top 36, fourth lift 38 having a top 40, fifth lift 42 having a top 44 and sixth lift 46 which is covered by a cap material 48. Landfill bioreactor 10 of this invention will typically include a piping layer on top of each waste lift. The bioreactor shown in FIG. 1 includes third piping layer 50 on top 36 of third lift 34, fourth piping layer 53 on top 40 of a fourth lift 38, fifth piping layer 54 on top 44 of fifth lift 42 and sixth piping layer 55 on top of 47 of sixth lift 46.

The landfill bioreactor 10 of this invention further includes a leachate withdraw pump 56 that is associated with piping manifold 26 and a blower 58 and an optional vacuum pump 60 also associated with piping manifold 26. Generally blower 58 and optional vacuum pump 60 will not be operated together. Either blower 58 will be used to inject air or other gas into landfill bioreactor 10, or vacuum pump 60 will be used to withdraw gases from landfill bioreactor 10. Landfill bioreactor 10 further includes one or more wells 62 located in landfill bioreactor for removing gases generated by the decomposition of waste material located in the landfill. Typically, each well 62 is placed vertically in landfill bioreactor 10 such that the well bottom 64 is located adjacent to the landfill bioreactor bottom 14. Top 66 of well 62 typically extend beyond the top of landfill bioreactor 10 to allow the gases to be removed from landfill bioreactor 10 naturally or, by using a compressor or directly to a flare.

Figure 2:
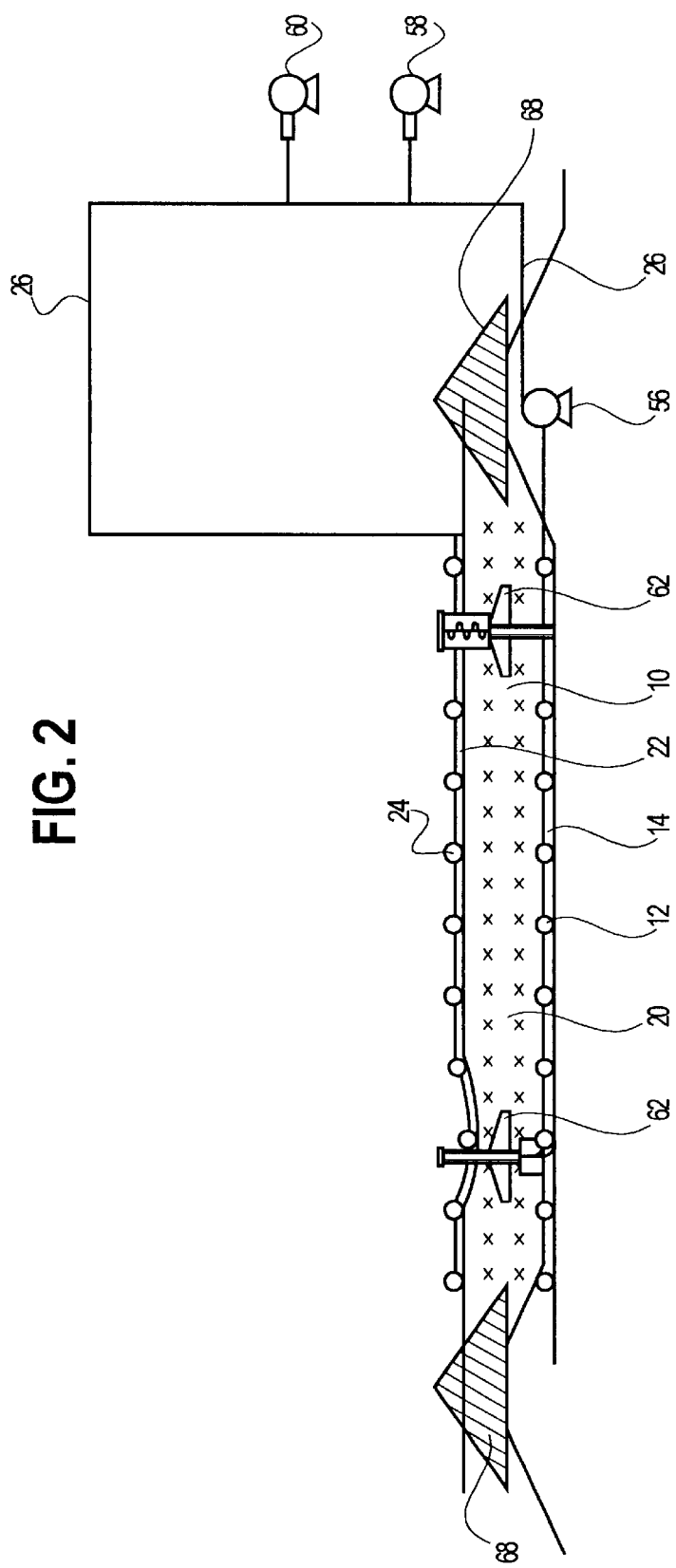
FIGS. 2–4 are side cross-section views of a landfill bioreactor of this invention that depict steps of a process of this invention for sequentially biodegrading layers of municipal solid waste.
Figure 3:
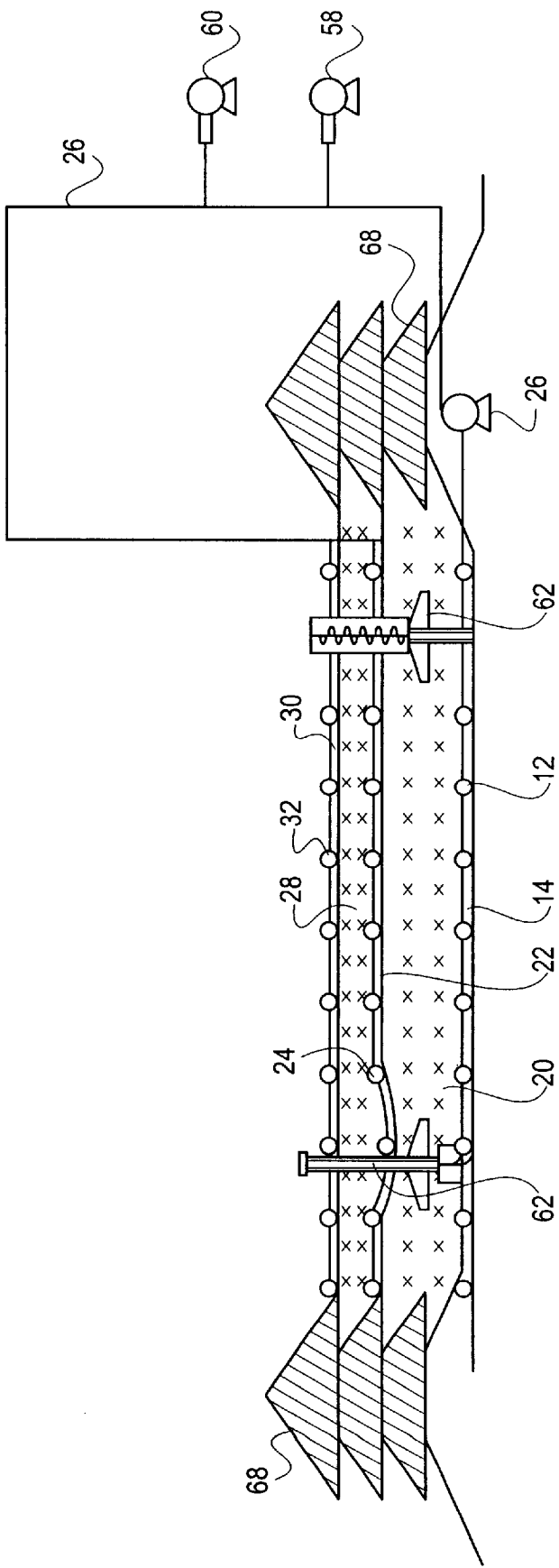
Figure 4:
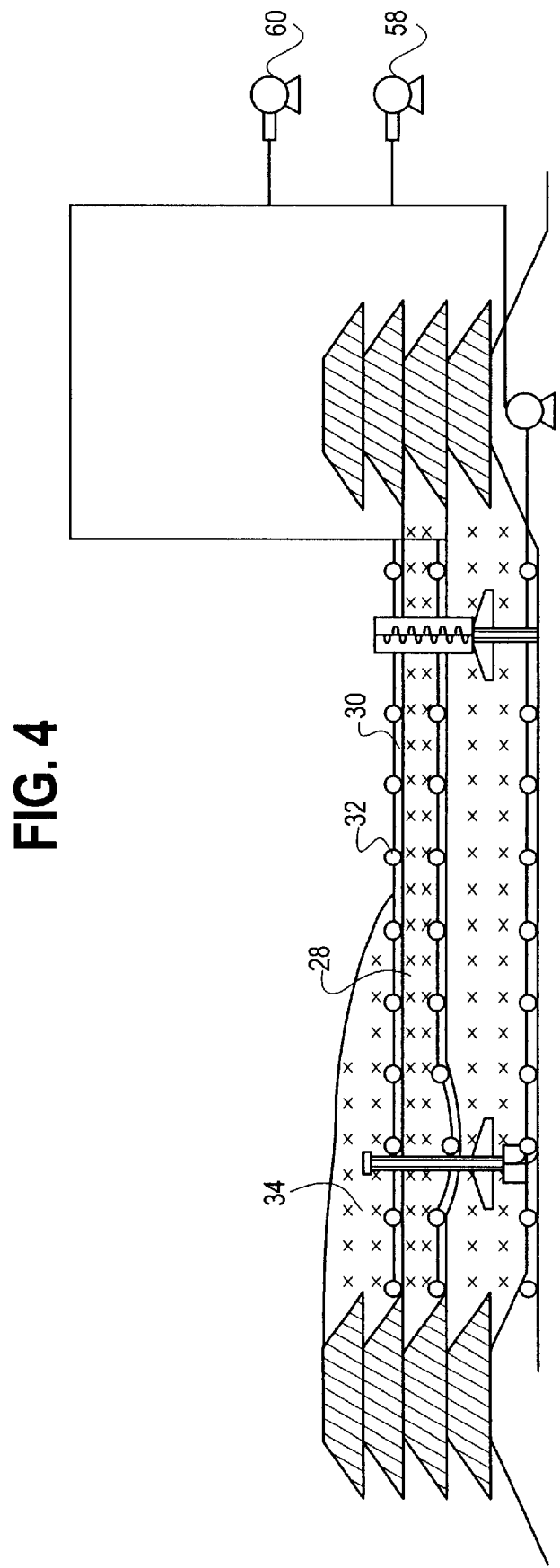

FIG. 1 depicts a landfill bioreactor 10 of this invention after it has been completely constructed and after sequential aerobic anaerobic processing much of the waste is complete. FIGS. 2–4 depict the steps involved in constructing several lifts of landfill bioreactor 10 as well as the process for operating the landfill bioreactor in sequential aerobic and anaerobic steps. In the bioreactor shown in FIG. 2, leachate withdraw system 12 is placed at a bottom 14 of landfill bioreactor 10. Leachate withdraw system 12 is associated with leachate withdraw pump 56 and with piping manifold 26. Also, one or more gas removal wells 62 are associated with landfill bioreactor 10. Finally, berms 68 are formed around the landfill bioreactor 10 to contain waste being added to the bioreactor. Once leachate withdraw system 12 is in place, a first lift 20 of waste is located in landfill bioreactor 10. First lift 20 includes a top surface 22. Once first lift 20 is in place, first piping layer 24 is placed on top 22 of first lift 20. Once first piping layer 24 is in place, it can be used to recirculate leachate into first lift 20 or it can be used to add make-up water or waste water to first lift 20 in order to wet and/or saturate the waste in first lift 20. Generally leachate or some source of water such as make-up water or waste water will be applied to top 22 of first lift 20 using first piping layer 24. As used herein the term water refers to any source of water including landfill leachate, fresh water, waste water or any combinations thereof. Water will typically be applied to first lift 20 for a period of time sufficient to saturate the waste material located in first lift 20. Preferably, water will be added to first lift 20, and to subsequent lifts in an amount sufficient to bring the moisture content of first lift to at least 35 wt % and preferably to at least 55 wt %. The moisture content of the waste can vary due in part to the moisture holding capacity of the waste.

According to FIG. 3, a second lift 28 of waste material is located on top 22 of first lift 20 and on top of first piping layer 24. Second lift 28 may be located on top 22 of first lift 20 either before, during or following the addition of water to first lift 20. Preferably, second lift 28 is located on top first lift 20 either during or after liquid has been applied to first lift 20. The location of second lift 28 on top of first lift 20 will generally take several months to complete. During this time, moisture may be added to the first lift via first piping layer 24. During this time, air may also be added to the first lift 20 and to any second lift waste material 28 through first piping layer 24. Injecting air through first piping layer 24 will cause air to permeate first lift waste material 20 wherever second lift waste material has been applied to cover first piping layer 24. As a result, compostable waste material located in first lift 20 and second lift 28 will begin the aerobic to decompose aerobically.

Generally, air injected through first piping layer 24 will permeate the first lift and second lift waste material adjacent to first piping layer 24. The degree of air permeation will of course depend upon the pressure and rate at which air is added to landfill bioreactor 10. It is preferred that air is injected through first piping layer 24 at a rate sufficient to permeate the entire depth of first lift 20 and second lift 28. During this time, air addition to landfill bioreactor 10 via first piping layer 24 may be halted and water injection into landfill bioreactor can via first piping layer 24 and/or second piping layer 32 can take place intermittently. Alternatively, air can be injected into landfill bioreactor via first piping layer 24 while water may be applied to landfill bioreactor 10 using second piping layer 32. In addition, each of the piping layers including first piping layer 24 may be constructed to allow air to be injected into certain zones of the piping system. That way, the injection of air can be controlled only into those areas of landfill bioreactor 10 where the piping system such as first piping system 24 is covered by a subsequent list of waste material. This will allow for more efficient operation of the blower of vacuum pumps that are used to facilitate aerobic decomposition of the waste material located in the lifts. Once construction of second lift 28 is complete, air and/or water addition to the waste material adjacent to first piping layer 24 may continue in order to maintain aerobic decomposition conditions. However, it is preferred that within about 4 to about 10 weeks after completion of second lift 28 that air injection be halted to first piping layer 24. Once air injection is halted to first piping layer 24, the biology of the decomposition of the waste material adjacent to first piping layer 24 will change quickly from aerobic decomposition to anaerobic decomposition.

The aerobic decomposition as discussed above and as will be discussed below is typically achieved by injecting air or some other oxygen containing gas into the decomposable waste material located in land-fill bioreactor 10. The term air injection as used herein includes the process of injecting an oxygen containing gas beside air into the waste lifts and using a vacuum pump to draw air into waste lifts from atmosphere.

FIG. 3 shows a landfill bioreactor 10 of this invention including the elements shown in FIG. 2 along with second lift 28 which is located on top of first lift 20 and first piping layer 24. In addition, FIG. 3 shows second piping layer 32 located on top 30 of second lift 28. First piping layer 24 and second piping layer 32 are both associated with piping manifold 26. The length of gas withdraw wells 62 have been extended to penetrate second lift 28. Also berms 68 have been raised to enclose the waste material contained in second lift 28.

Once construction of second lift 28 is complete and once third piping layer 50 is in place, third lift 34, as shown in FIG. 4 is constructed. FIG. 4 shows third lift 34 partially constructed. As third lift 34 is being constructed, air injection into third piping layer 50 is initiated to begin aerobic decomposition of compostable waste adjacent to third piping layer 50. Once air injection to third piping layer 50 is begun, the air injection into second piping layer 32 may be halted. Alternatively, air may be injected into one or more of the piping layers until desired amounts of aerobic decomposition is achieved. Preferably, once air injection is begun to third piping layer 50, water is injected continuously or intermittently into underlying piping layers such as first piping layer 24 to promote the anaerobic decomposition of waste below first piping layer 24.

Figure 5:
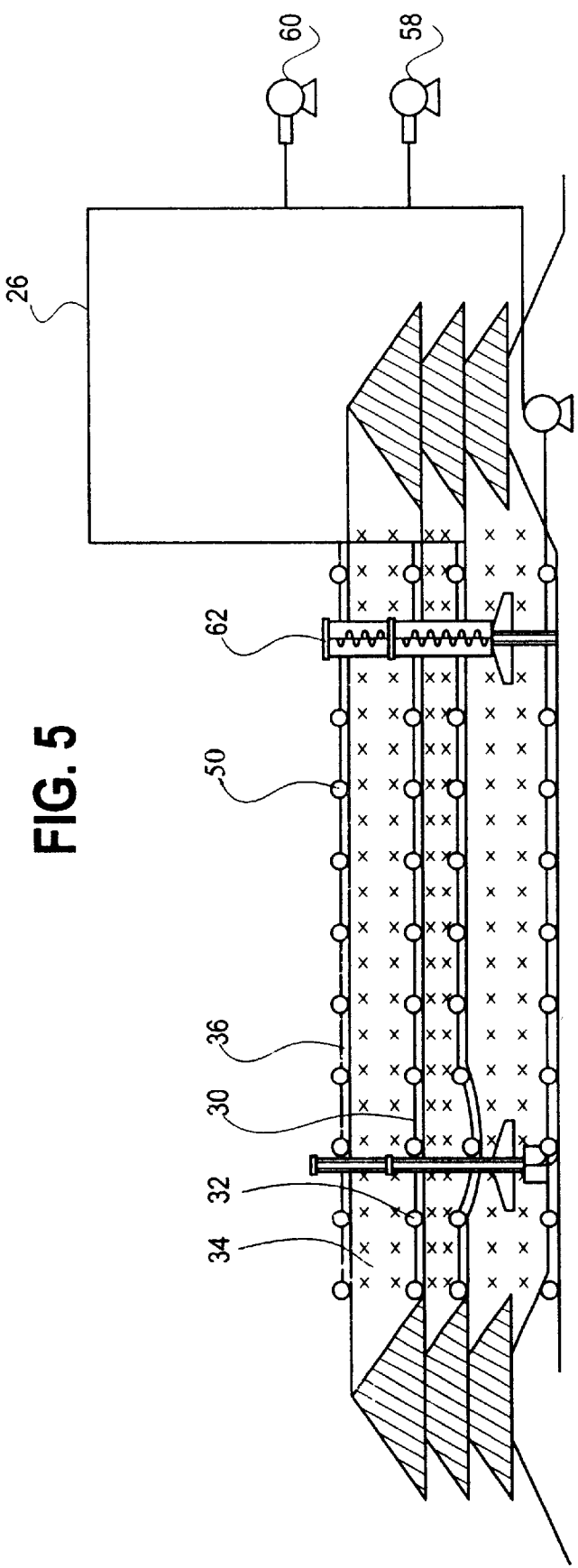
FIG. 5 is a view of a waste lift found in a bioreactor of this invention.

FIG. 5 depicts a landfill bioreactor 10 of this invention including three completely formed lifts each lift further including third piping layer located on top of each lift 34. In addition, gas extraction wells 62 have once again been lengthened to extend through third lift 34. At this point, construction of a fourth lift 38 begins, air injection into third piping layer 58 is begun and air injection into second piping layer 32 is phased out in order to convert second lift 28 from aerobic to anaerobic decomposition. Air is injected into the waste adjacent to third piping layer 50 at least until the construction of fourth lift 38 is complete. Preferably, air is injected into third piping layer 50 for 0 days to several months or more following completion of fourth lift 38.

The construction of lifts and the injection of air and/or leachate into the landfill bioreactor 10 of this invention is continued until the desired number of lifts are constructed. As the construction of a lift is completed, the lift being constructed will generally be undergoing aerobic decomposition along with the adjacent lift. Because the adjacent lift had already undergone a period of aerobic bioreduction during this construction, the anaerobic biodegradation of the adjacent lift will be well advanced. As described above, upon completion of the construction of the lift, a piping layer is located on top of the lift and construction to the next lift has begun all the while injecting air into the bioreactor via the top most piping system.

The landfill lifts of this invention must include at least some compostable waste materials. Preferably, the waste material used to construct the landfill lifts will include at least 50% and preferably 75% or more of compostable material. Preferably, the waste material is municipal solid waste. Additionally, industrial wastes, sludges, and biosolids are typically commingled with the municipal solid waste. Each lift preferably has a thickness of from 5 feet to about 20 feet with a lift thickness of about 10 feet being preferred. This lift thickness allows air to penetrate into the landfill lifts above and below a given piping layer to cause accelerated aerobic decomposition of the compostable waste material.

The piping used to construct leachate withdraw system 12 and the various piping layers associated with each lift may be any type of piping that is useful in landfill bioremediation. Preferably, the piping is a plastic piping such as high density polyethylene (HOPE). The piping used for the leachate withdraw system and for the various piping layers should include some type of perforation(s) to allow for the uniform injection and/or withdrawal of gases and/or liquids such as leachate to and from landfill bioreactor 10. Preferably, the piping includes uniformly distributed perforations that allow for the uniform addition or removal of gases and/or aqueous solutions from the lift materials. In addition, the piping may be packed with packing materials such plastic mesh or ground up tires to facilitate distribution and/or removal of gases and liquids from the landfill bioreactor.

If desired, the layers of piping may be placed upon a layer of material that will facilitate the distribution or removal of air and/or liquids from the landfill bioreactor. Such materials may include, for example, tires, bits, gravel, sand or combinations of coarse materials.

The sequential aerobic/anaerobic degradation of the landfill lifts of landfill bioreactor 10 of this invention causes a reduction of volume of the landfill lifts. This reduction in volume can be improved by compacting the landfill lifts following aerobic and/or anaerobic bioremediation. Thus, for example the partially constructed bioreactor can be mechanically compacted once air injection into the second landfill lift is deemed complete. This will typically occur before third piping layer 50 is located on top 36 of third lift 34.

The addition of materials to accelerate the aerobic and/or anaerobic decomposition of compostable waste material is within the scope of this invention. Additive materials may be incorporated to the waste as it is being located in lifts or it may be added to the waste through the gas or liquids added to the lifts through the piping systems. For example, sludge, animal manure, fermentor byproducts and so forth may be added to the waste material or to liquids added to the waste material by the piping systems in order to provide microorganisms that accelerate or enhance aerobic and/or anaerobic biodegradation of compostable waste. In addition, nutrients such as phosphorous, phosphoric acid, biosolias, phosphate buffed and the like may be added directly to the waste or may be added to liquids applied to the waste to accelerate anaerobic or aerobic degradation of a municipal solid waste.

Figure 6:
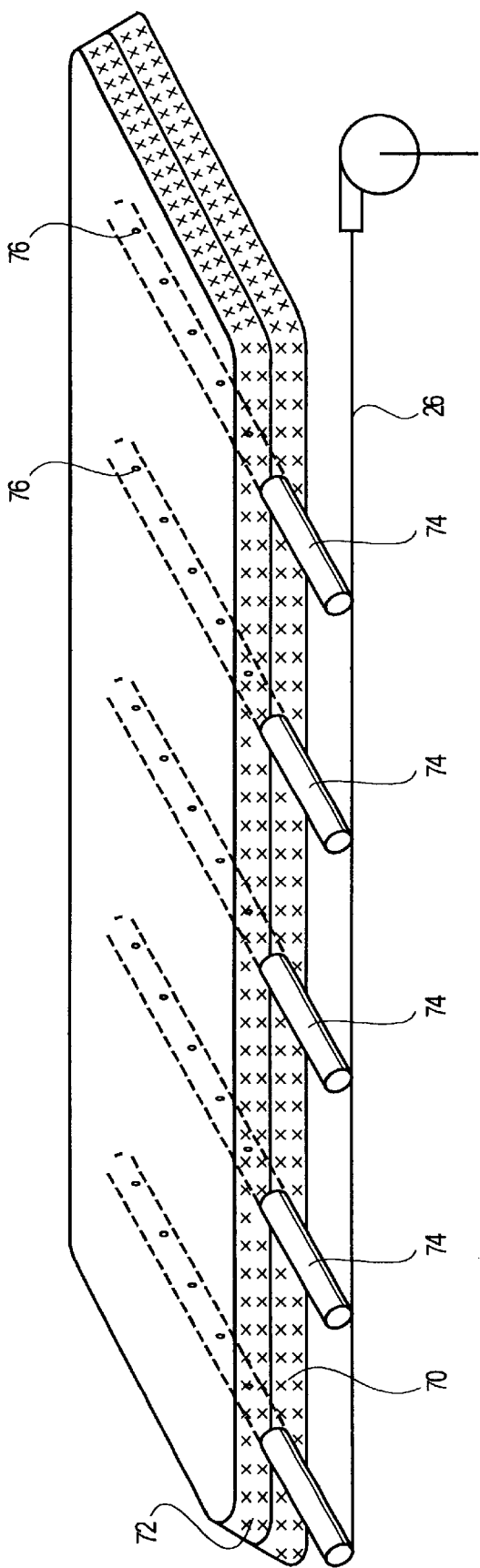
FIG. 6 is a view of two landfill lifts used inabioreactor of this invention.

FIG. 6 is a perspective view of two landfill lifts, 70 and 72 used in bioreactor 10 of this invention including a piping layer 74 located between 70 and 72. The piping used in piping layer 74 includes perforation and the piping is associated with piping manifold 26 which in turn is associated with a pump and a compressor or vacuum pump to supply and/or withdraw gases and liquids from the lift.

Figure 7:
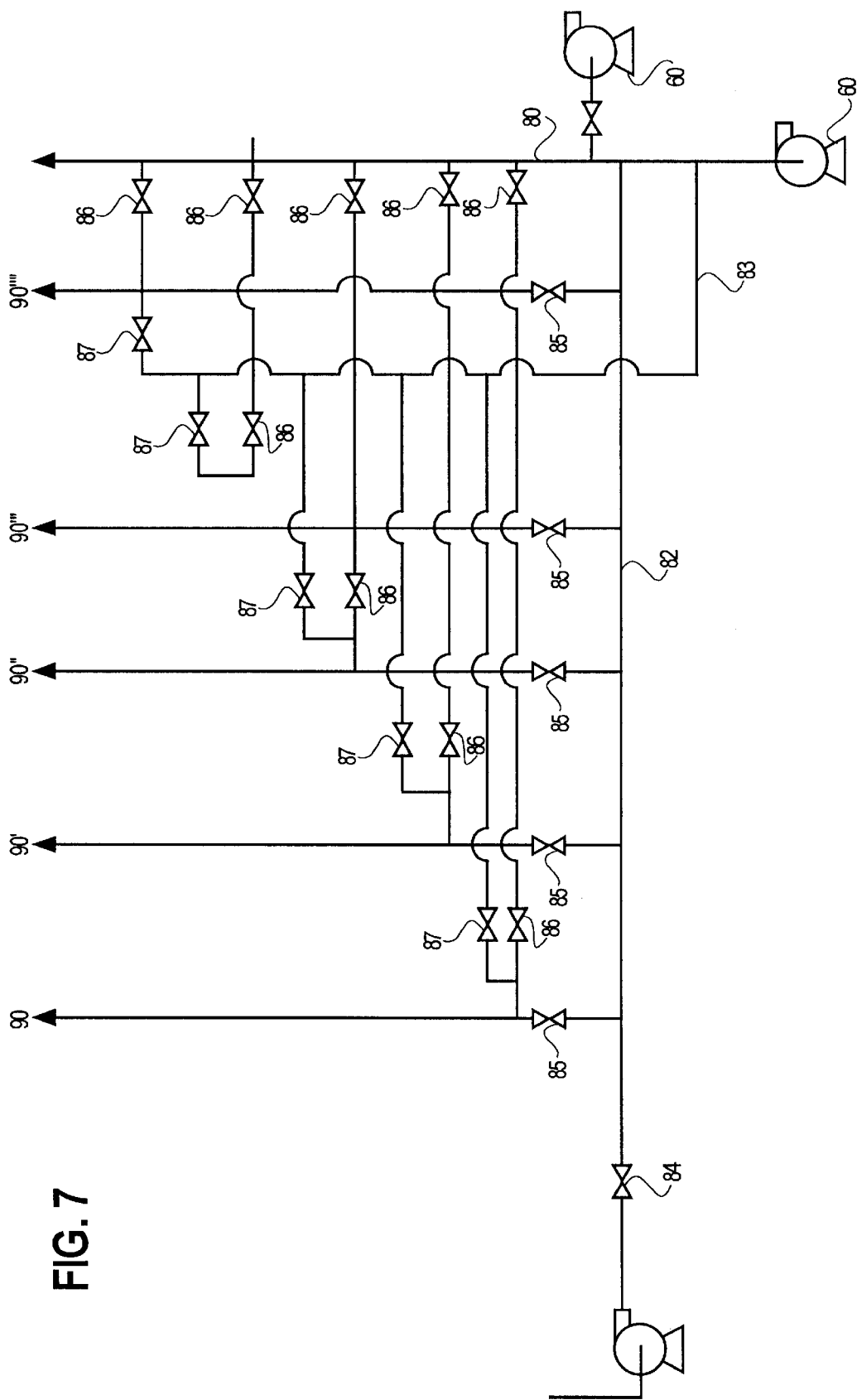
FIG. 7 is a diagram of a piping manifold that can be used to accomplish the process of this invention.

FIG. 7 shows a piping manifold useful in this invention for supplying and withdrawing liquids and gases to and from multiple piping layers associated with landfill bioreactor 10 of this invention. Piping manifold 26 includes a gas supply header 80 associated with blower 58, a liquid header 82, and a gas withdraw header 83 is associated with a vacuum pump 60. Liquid header 82 is associated with pump 64. Liquid header 82 is isolated from leachate withdraw system 12 and by valve 84. Liquid header 82 is also isolated from each piping layer 90, 90', 90", 90"', and 90"" by valves 85. Similarly, gas supply header 80 is isolated from each piping layer by a valve 86 and gas withdraw header 83 is isolated from each piping layer by a valve 87.

Piping manifold 26 is useful for controlling the injection and/or withdraw of gases and liquids to specific piping layers associated with known lifts in landfill bioreactor 10. Controlling the location of gas and/or liquid injection or withdraw allows the operator to select whether a landfill lift will be remediated under aerobic or anaerobic conditions.

Variations in the method for mediating solid waste using a plurality of horizontally spaced piping layers are within the scope of this invention. For example, anaerobic conversion of waste lifts may be replaced by aerobic conversion in the event, for example that insufficient moisture and water is available to maintain the landfill at a desirable moisture levels. This may occur seasonally in landfills during time of extremely cold weather or during periods of drought and the absence of sufficient moisture in the landfill can promote undesirable landfill fires.

In another variation, the aerobic treatment step may be extended into extremely wet weather, where the landfill includes a high biosolids content or in periods when the incoming waste stream is larger than usual and the lifts fill rapidly.

What we claim is:

1. A method for biodegrading municipal solid waste comprising the steps of:
    a. creating a landfill bioreactor having a bottom surface;
    b. locating leachate withdrawal piping on the landfill bottom surface;
    c. placing a first lift of waste material on top of the leachate withdrawal piping to form a first lift having a first lift top surface;
    d. placing a first piping layer on the top surface of the first lift;
    e. placing a second lift of waste on top of the first piping layer form a second lift having a second lift top surface;
    f. placing a second piping layer on the top surface of the second lift;
    g. bringing the second lift to field moisture capacity; and
    h. directing air into the second lift using the first piping layer.

2. The method of claim 1 wherein the second lift includes compostable waste that is aerobically bioremediated by adding air into the second lift using the first piping layer.

3. The method of claim 2 wherein water is added to the first lift of waste material.

4. The method of claim 3 wherein the water is added to the first lift of waste material through the first layer of piping.

5. The method of claim 3 wherein the water is applied to the top of second lift.

6. The method of claim 3 wherein the water is selected from landfill leachate, fresh water, waste water, and combinations thereof.

7. The method of claim 2 including the further step of placing a third lift on top of the second lift wherein the third lift has a third lift top surface.

8. The method of claim 7 wherein air addition to the second lift using first piping layer is stopped to give a partially composted second lift.

9. The method of claim 8 wherein the third lift includes compostable waste that is aerobically bioremediated by adding air into the second lift using the second piping layer.

10. The method of claim 9 wherein air addition using the second piping layer is halted and the first lift is allowed to undergo anaerobic decomposition.

11. The method of claim 10 wherein leachate is collected in the leachate withdrawal piping and directed into the first lift using the first piping layer.

12. The method of claim 11 wherein the air addition to the second lift using the second layer of piping is halted after construction of the third lift is complete.

13. The method of claim 12 including the further step of placing a third layer of perforated piping on the top surface of the third lift and directing air into the third piping layer.

14. The method of claim 13 wherein air is directed into the second lift by blowing air into the second piping layer.

15. The method of claim 14 wherein water is directed into second lift using the second piping layer.

16. The method of claim 12 wherein the first lift and second lift are mechanically compacted.

17. The method of claim 12 wherein water is added to the third piping layer during the aerobic bioreduction of the second lift.

18. The method of claim 12 wherein air is directed into the second lift for at least one month after construction of the third lift is complete.

19. The method of claim 1 wherein the waste is shredded before placing the waste in the first lift.

20. The method of claim 1 wherein a plurality of gas vent pipes are located in the bioreactor cell.

* * * * *